Figure 1:
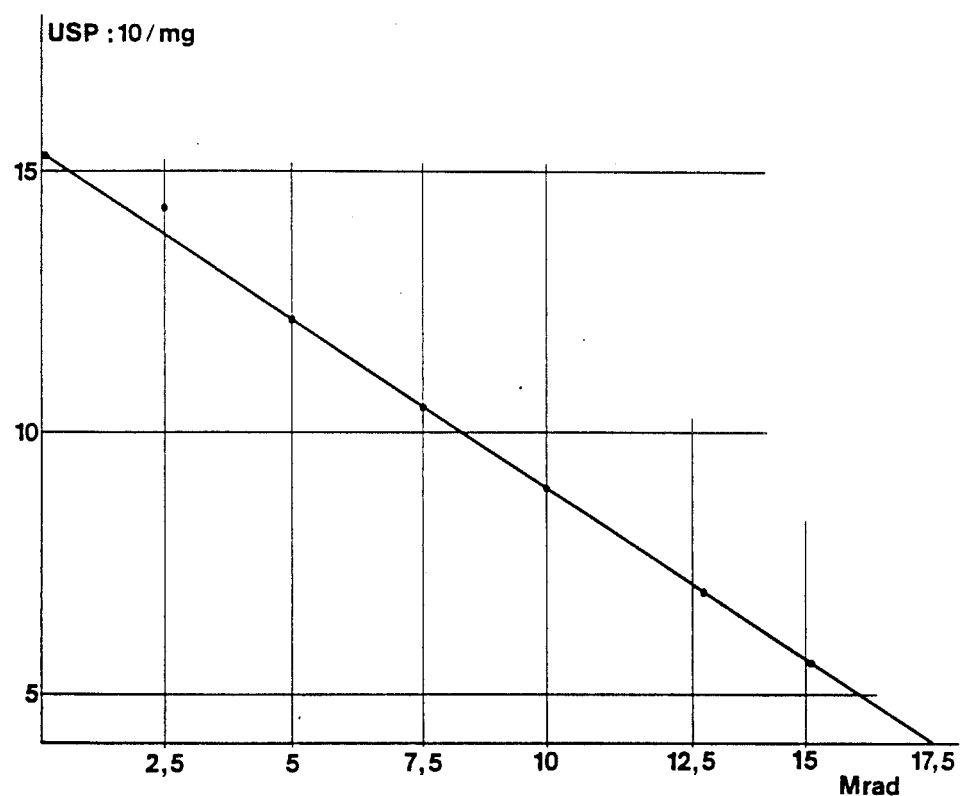

United States Patent [19]

De Ambrosi et al.

[11] Patent Number: 4,987,222

[45] Date of Patent: Jan. 22, 1991

[54] PROCESS FOR THE CONTROLLED PREPARATION OF LOW MOLECULAR WEIGHT GLUCOSAMINOGLYCANS

[75] Inventors: Luigi De Ambrosi, Santhia; Walter Recchia; Gianni Ferrari, both of Milan, all of Italy

[73] Assignees: Mediolanum Farmaceutici Spl; Laboratori Derivati Organici, Milan, Italy

[21] Appl. No.: 120,953

[22] Filed: Nov. 16, 1987

[30] Foreign Application Priority Data

Nov. 24, 1986 [IT] Italy ................. 22434 A/86

[51] Int. Cl.$^5$ ............................. C08B 37/10
[52] U.S. Cl. ...................... 536/21; 536/55.1; 536/55.3; 536/124; 514/54; 210/748
[58] Field of Search .......... 536/21, 51, 55.1, 55.3, 536/124; 514/54, 56, 59; 376/156; 210/748

[56] References Cited

U.S. PATENT DOCUMENTS

| | | | |
|---|---|---|---|
| 3,453,194 | 7/1969 | Bennett et al. | 514/56 |
| 3,766,167 | 3/1971 | Lasker et al. | 536/121 |
| 4,303,651 | 12/1981 | Lindahl et al. | 514/56 |
| 4,351,938 | 9/1982 | Barnett | 536/21 |
| 4,401,662 | 8/1983 | Lormeau et al. | 514/54 |
| 4,401,758 | 8/1983 | Lormeau et al. | 514/54 |
| 4,489,066 | 12/1984 | Fedeli | 536/21 |
| 4,496,550 | 1/1985 | Lindahl et al. | 514/54 |
| 4,788,307 | 11/1988 | Lormeau et al. | 536/21 |
| 4,791,195 | 12/1988 | Bianchini et al. | 536/21 |
| 4,804,652 | 2/1989 | Lormeau et al. | 536/21 |

FOREIGN PATENT DOCUMENTS

| | | | |
|---|---|---|---|
| 0066908 | 12/1982 | European Pat. Off. | 514/54 |
| 0121067 | 10/1984 | European Pat. Off. | |
| 0244236 | 11/1987 | European Pat. Off. | 536/21 |
| 0136572 | 7/1979 | Fed. Rep. of Germany | 514/54 |
| 2495935 | 6/1982 | France | 514/54 |

OTHER PUBLICATIONS

Jooyandeh et al; Chemical Abstracts 74: 121070; (1971).
Morgan et al; Chemical Abstracts 78:13382m; (1973).
Chawla et al; Pharmacology 20:224–228 (1980).
Cade et al; Thrombosis Research 35:613–625 (1984).
Edwards et al; Carbohydrate Polymers 5:473–478 (1985).
Jooyandeh et al; Radiat. Res. 45:455–461 (1971).

Primary Examiner—Ronald W. Griffin
Assistant Examiner—Nancy S. Carson
Attorney, Agent, or Firm—Parkhurst, Wendel & Rossi

[57] ABSTRACT

A process for the controlled preparation of low molecular weight glucosaminoglycans by treating conventional high molecular weight glucosaminoglycans in the solid state or in solution form with a rectilinear gamma ray beam at doses within the range of 2.5 to 20 Mrad supplied by successive irradiation stages with cooling intervals between one irradiation stage and the next in the dynamic phase.

The mixture obtained is subjected to fractionation, purification, neutralization and lyophilization. The glucosaminoglycans obtained have a molecular weight of between 1000 and 35,000 daltons and are used for the preparation of pharmaceutical compositions possessing antithrombotic, fibinolytic, antiatherogenic and heparin cofactor II activation activity.

12 Claims, 3 Drawing Sheets

PROCESS FOR THE CONTROLLED PREPARATION OF LOW MOLECULAR WEIGHT GLUCOSAMINOGLYCANS

This invention relates to a process for the controlled preparation of low molecular weight glucosaminoglycans, and the relative pharmaceutical compositions.

Specifically, said process is based on the treatment of conventional glucosaminoglycans with gamma rays in suitable dosage to obtain glucosaminoglycans of controlled molecular weight, preferably between 1000 and 35,000 daltons.

The process according to the invention is applicable to glucosaminoglycans in general, and in particular to heparin, slow moving heparin, fast moving heparin, heparan sulphate, dermatan sulphate, chondroitin-4-sulphate, chondroitin-6-sulphate, keratan sulphate, hyaluronic acid, alginic acid and mesoglycan, either singly or in mixtures of the various compounds.

Conventional heparins are known as effective antithrombotic agents, but their use is limited by a relatively high level of hemorrhagic complications.

For this reason, in recent years scientific and clinical interest has been directed towards the study of particular forms of depolymerized heparins which have proved on pharmacological investigation to possess interesting antithrombotic and fibrinolytic characteristics associated with low hemorrhagic power, as described for example in J. F. Cade, Thrombosis Research, 613–625 (1984).

With regard to the other glucosaminoglycans, reduction in the molecular weight alters oral absorption and improves pharmacological activity.

Processes for preparing low molecular weight heparins are described in a very large series of patents and publications.

These processes are based on chemical or enzymatic treatment of conventional heparins.

Chemical treatment includes for example treatment with oxidants such as hydrogen peroxide, nitrous acid, sodium peroxide and potassium permanganate, or with pyridine derivatives; or alternatively de-esterification and re-esterification, de-amination and re-amination, and sulphuration.

Such treatment is described for example in U.S. Pat. Nos. 4,500,519; 4,351,938 and French patent No. 2,538,404.

In enzymatic treatment, numerous purified enzymes (heparinase) and crude enzymes (pancreatic extracts) have been used, as described for example in U.S. Pat. No. 3,766,167.

The known heparin depolymerization processes have the problem of impossibility of controlling molecular breakdown and maintaining the active structures. In this respect, these processes lead to the formation of a non-reproducible series of derivatives which have to be separated by successive purification and fractionation according to the molecular weights of therapeutic interest.

The known art also describes the treatment of heparin with gamma rays, for example in Chawla and Hayward (Pharmacology 20; 224; 1980) and in Edwards (Carbohyd. Polymers 5; 473; 1985).

This treatment includes the production of heparin membranes with N,N-diethylaminoethylcellulose acetate and the sterilization of heparin solutions. The conclusions of these works claim a low incidence of molecular breakdown and a minimum loss of anticoagulant activity.

We have surprisingly found that by treating glucosaminoglycans with gamma rays by the process according to the invention, the desired glucosaminoglycan molecular weight alterations are obtained while maintaining sufficient stability of the active sulphated structures, i.e. particular glucosaminoglycan molecular aggregates are obtained characterised by the presence of groups having high antithrombotic activity, reduced anticoagulant activity, low hemorrhagic effect and minimum platelet aggregation activity.

In practice, these characteristics are determined by the molecular weight reduction and by the preservation of the functional groups active towards antithrombin III and cofactor II.

The process for the controlled preparation of low molecular weight glucosaminoglycans according to the present invention is characterised by treating conventional high molecular weight glucosaminoglycans in the solid state or in solution form with a rectilinear gamma ray beam at doses within the range of 2.5 Mrad to 20 Mrad supplied by successive irradiation stages with cooling intervals between one irradiation stage and the next, then subjecting the solution obtained to chemical fractionation in order to eliminate the high molecular weight fractions, purifying the desired base fraction by reverse osmosis, further fractionating the purified solution through a Sephacryl resin column, transferring the fractions obtained to cationic resins, then neutralising them with alkaline solutions and lyophilizing.

These and further characteristics and advantages of the process according to the present invention will be more apparent from the detailed description given hereinafter relating to preferred embodiments of the process and given by way of non-limiting example.

The process according to the invention can use industrially produced heparins having variable structural characteristics with an anticoagulant activity varying from 100 U/mg to 250 U/mg USP. This anticoagulant activity difference is a function of the purity and molecular integrity and depends on the operations used for separating the glucosaminoglycans from the protein matrix and the methods used for removing the contaminant components.

With regard to the other glucosaminoglycans, compounds can be used having the normal chemical and physical characteristics, for example dermatan of M.W. 24,000–35,000 daltons and heparan of M.W. 13,000–16,000 daltons.

These raw materials can be used either in the solid state in powder form, or as aqueous solutions, possibly buffered to pH 2-8 in order, where necessary, to prevent the formation of an acid environment with possible interference with the structural arrangement of the molecule.

The raw material concentrations in solution lie between 1% and 30% w/v depending on the type of product used. Before treatment, the solutions are deaerated and are then purged with pure nitrogen to eliminate residual air.

The gamma ray treatment is conducted in pyrex glass containers to prevent the characteristic colour transformation to maroon or brown which would occur with common commercial glass during the course of the treatment.

Various radio nuclides can be used as the gamma ray source, such as $Co^{60}$, $Am^{241}$, $Cs^{137}$ and $Ra^{226}$, $Co^{60}$ is preferably used, this emitting high energy rays (1.25 MeV) with a rectilinear path. These rays are of high frequency, are monochromatic and do not induce radio activation phenomena in the compounds subjected to their action.

The gamma rays are applied by a succession of partial treatments at doses of 2-3 Mrad with various intervals between the end of one treatment and the beginning of the next, to attain a total irradiation dose of between 2.5 and 20 Mrad supplied in the static or preferably in the dynamic phase.

The purpose of the interval between one treatment and the next is to prevent system overheating, which would lead to undesirable alteration in the product chemical and physical characteristics. The process is therefore operated at a temperature of between 20° and 55° C. and preferably between 20° and 40° C.

On termination of the irradiation treatment, the solutions are subjected to chemical fractionation in order to eliminate the high molecular weight fractions. This operation is conducted on solutions diluted to 2-5% w/v in water, by treating them with solvents such as methanol, ethanol or acetone in a quantity of 10-30% v/v with respect to the solution. The precipitated fractions are separated by decanting and the decanted liquid is fed with further solvent to recover the desired base fraction.

The base precipitate, after dissolving in water, is purified by reverse osmosis with 500 cutoff until total removal of the low molecular weight fractions and saline components is obtained.

The purified solution is further fractionated through Sephacryl S.200 or Sephadex 50 columns in the presence of a salinity the concentration of which varies according to the particular glucosaminoglycan.

The active fractions collected from this passage through the resin are finally depyrogenated, filtered under sterile conditions and lyophilized.

As an alternative, the active fractions collected from this passage through the resin can be transferred to Castel C/300 or C/20 cationic resins and then neutralised with alkaline Na, Ca, K, Mg or Li solutions to convert the glucosaminoglycans into the respective salts.

The solutions obtained are purified by reverse osmosis with 500 cutoff to eliminate the excess alkaline elements.

The collected fractions are finally depyrogenated, filtered under sterile conditions and lyophilized.

By operating under the described conditions, molecular glucosamino glycan fractions possessing well defined pharmacological activity are formed with good reproducibility.

In particular, when operating under the described conditions, the amount of depolymerization increases as a function of the increase in the gamma ray dose administered, and correspondingly a reduction in anticoagulant activity is obtained together with an increase in the anti-Xa/APTT ratio, i.e. the ratio of anti-Xa activity to the active partial thromboplastin time.

The results obtained when operating under the described conditions on heparins of various initial U/mg USP values are reported in the following Tables 1, 2 and 3 by way of illustration.

TABLE 1

| | ANTICOAGULANT ACTIVITY IN USP | | | | | | | |
|---|---|---|---|---|---|---|---|---|
| Mrad | 0 | 2.5 | 5 | 7.5 | 10 | 12.5 | 15 | 17.5 |
| HP 1 | 160 | 145 | 130 | 94 | 80 | 75 | 65 | 55 |
| HP 2 | 167 | 136 | 120 | 88 | 75 | 64 | 53 | 47 |
| HP 3 | 156 | 130 | 120 | 103 | 78 | 63 | 53 | 42 |

TABLE 2

| | MOLECULAR WEIGHTS (values $\times 10^3$) | | | | | | | |
|---|---|---|---|---|---|---|---|---|
| Mrad | 0 | 2.5 | 5 | 7.5 | 10 | 12.5 | 15 | 17.5 |
| HP 1 | 15 | 13.6 | 12.1 | 11 | 9.1 | 7.5 | 7.3 | 6.6 |
| HP 2 | 15.6 | 14.3 | 12.7 | 10.9 | 8.5 | 7.3 | 6.6 | 5.7 |
| HP 3 | 15.2 | 14 | 12.3 | 10.9 | 8.1 | 7.7 | 6.6 | 5.1 |

TABLE 3

| BIOLOGICAL ACTIVITY OF THE PURIFIED FRACTIONS, TREATED WITH 17.5 Mrad | | | |
|---|---|---|---|
| | APTT | anti-Xa | Ratio |
| HP 1 | 12 | 108 | 9 |
| HP 2 | 13 | 98.8 | 7.6 |
| HP 3 | 15 | 120 | 8 |

STATISTICAL EVALUATION OF THE RESULTS

FIG. 1 shows the data relative to the variation of heparin activity (USP) with irradiation in Megarads.

The significant mathematical function which interpolates the parameter correlation is a straight line, the correlation coefficient (R) of which is of P.001 significance (excellent linearity).

Figure 2:
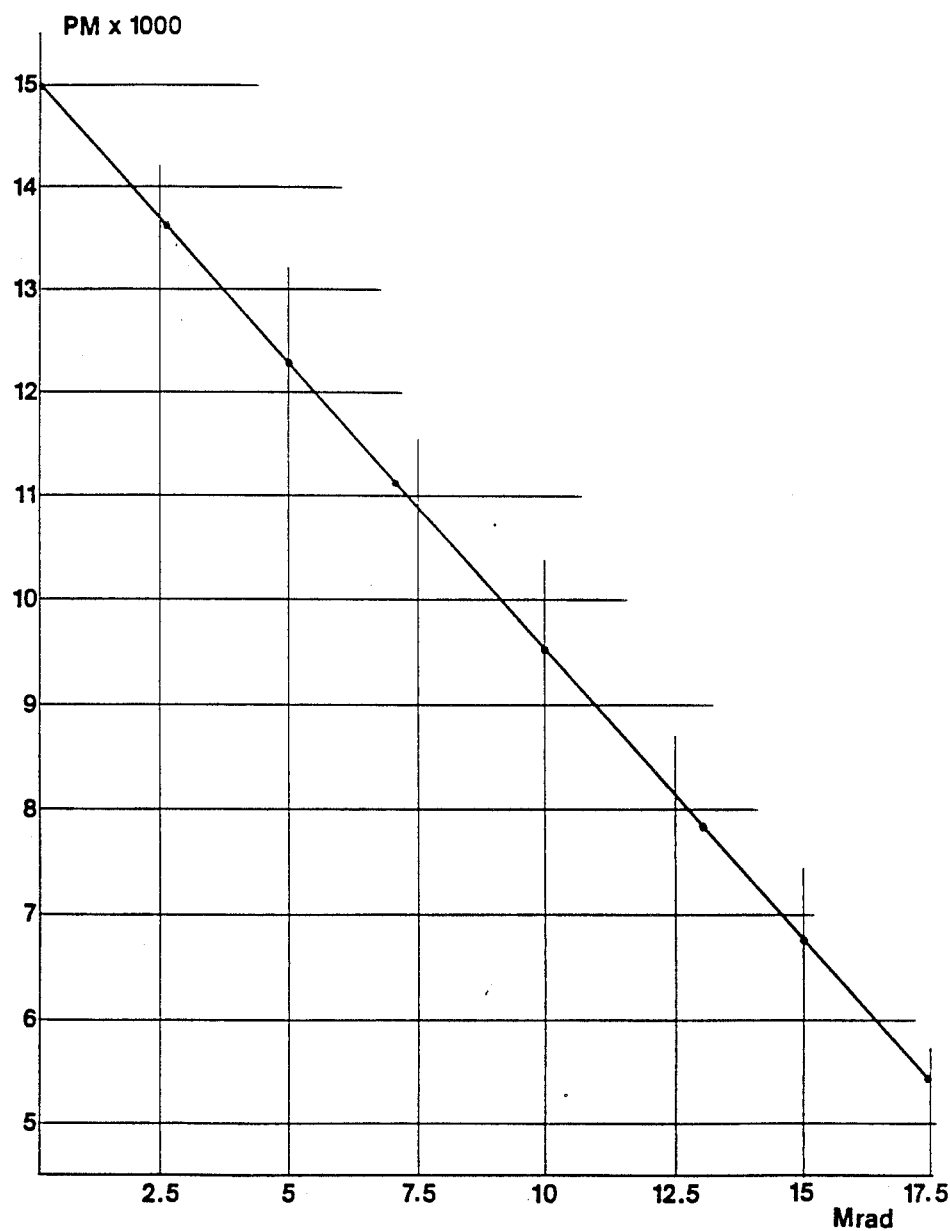

FIG. 2 shows the data relative to the variation of molecular weight with irradiation in Megarads.

The mathematical function which best interpolates the correlation is a straight line the correlation coefficient R of which is of P.001 significance (excellent linearity).

The action of heparin depolymerized with gamma rays according to the invention was also evaluated on the bleeding time in comparison with conventional heparin.

The test was carried out following the method described by Dejana et al. [Thromb. Haemostasis (1982) 48, 108] on anesthetised rats of which 2 mm had been cut from the point of the tail.

The time for bleeding to completely cease was measured (no rebleeding within 30 seconds).

The heparins were administered 15 minutes before cutting the tail.

The results are given in Table 4.

TABLE 4

| | BLEEDING TIME (MINUTES) | | |
|---|---|---|---|
| DOSE | HEPARIN | DEPOL. HEPARIN | CONTROL |
| 0.25 mg/kg | 8 | 4 | |
| 0.5 mg/km | 12 | 5 | |
| 1 mg/kg | 25 | 7.5 | |
| CONTROL | | | 5 |

No. of animals per dose = 10

Results analogous to those reported were obtained on applying the described depolymerization and purification to solutions of various glucosaminoglycans such as heparan sulphate, dermatan sulphate, chondroitin-4-sulphate, chondroitin-6-sulphate, hyaluronic acid and alginic acid.

In the case of dermatan sulphate, the extent of depolymerization as a function of the irradiation in Mrad confirms the validity of the system.

Table 5 shows the molecular weights obtained for different irradiation intensities.

TABLE 5

| DEPOLYMERIZED DERMATAN SULPHATE | | | | | | |
|---|---|---|---|---|---|---|
| Mrad | 0 | 2.5 | 5 | 7.5 | 10 | 12.5 | 15 |
| M.W. (× 1000) | 31.2 | 24.8 | 18 | 12 | 10.4 | 8.5 | 5 |

Figure 3:
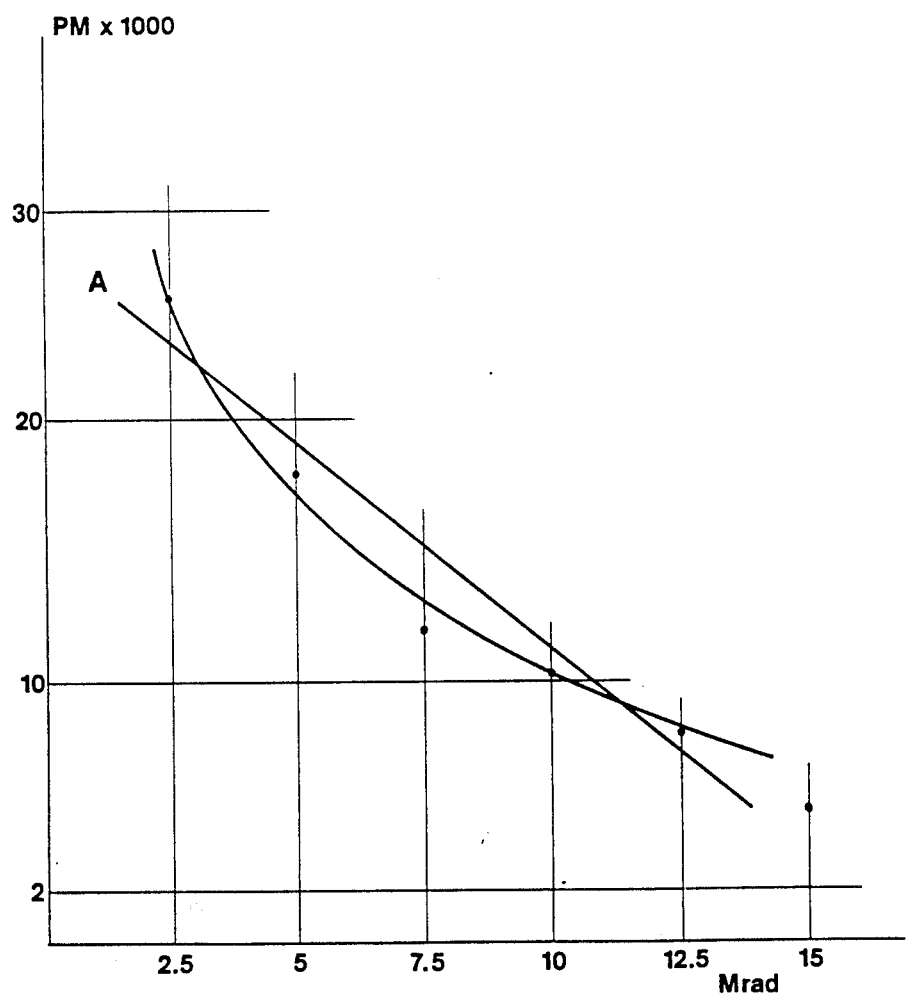

FIG. 3 shows the statistically representative function relating M.W. to Mrads, the result of which is a straight line with its correlation coefficient R of P.001 significance.

This is an evident sign of good linearity between M.W. reduction and irradiation in Mrad.

The depolymerization of glucosaminoglycans, including heparin, can also be implemented by treating the raw material with gamma rays in its solid state in the form of powder, to obtain depolymerized products having the required molecular weight.

The depolymerized glucosaminoglycans according to the present invention having a molecular weight of 1000–35,000 daltons and in the form of Na, Ca, K, Mg or Li salts, either alone or in association with other products, are useful in the prevention or treatment of thromboses including ocular pathologies. They are also useful as fibrinolytic, antiinflammatory, anticomplement and antiatherogenic agents, and as heparin cofactor II activants.

Said glucosaminoglycans are used therapeutically as components in pharmaceutical compositions for the preparation of tablets, capsules, drops, solutions for oral administration, collyria, suppositories, ointments, vials for intravenous, intradermic and intramuscular injection, and special preparations for sustained-release intradermic absorption.

The following examples are given for non-limiting illustration of the preparation of glucosaminoglycans according to the present invention.

EXAMPLE 1

16 g of sodium heparin from intestinal mucosa having 170 U/mg USP and a molecular weight of 14,000 daltons are dissolved in a quantity of pH 7 phosphate buffer solution such as to obtain a total volume of 100 ml.

The solution is poured into a 150 ml pyrex glass container, deaerated under vacuum and purged with pure nitrogen.

The hermetically sealed container is subjected to successive treatments each of 2.5 Mrad to a total of 17.5 Mrad, by exposure to gamma rays emitted by the radio nuclide Cobalt[60].

After irradiation, the solution is diluted to 5% with distilled water and treated with 15 ml of ethanol slowly under energetic agitation. After leaving overnight at +5° C., the overlying liquid is decanted and is clarified by filtration, 25 ml of methanol are added to the filtrate under agitation, and the suspension obtained is kept for 12 hours at +5° C.

The precipitate collected after decanting is dried under vacuum at 40° C.

The powder obtained is dissolved in water to a concentration of 2% w/v and the solution is purified by reverse osmosis through a 500 MWCO membrane by concentration, dilution and further concentration.

The concentrate is diluted with water to 1% of heparin w/v and NaCl is added to a concentration of 1M.

The solution is passed through a column of 10 cm diameter and 2 m height containing 5 kg of Sephadex 50, at a throughput of 50 ml/h.

Various fractions are collected with respect to readings at 230 nm and APTT and anti-Xa activities.

The active fractions are pooled, depyrogenated under hot conditions overnight, filtered through a 0.45 membrane filter and lyophilized.

The product obtained amounts to 5 g.

Alternatively, the active pooled fractions are treated through C/20 cationic resin and neutralised in the form of alkaline Ca, K, Mg or Li salts.

The neutralised solutions are purified by reverse osmosis with 500 MWCO, concentrated, depyrogenated, filtered under sterile conditions and lyophilized.

The sodium salt obtained has the following characteristics:

| | |
|---|---|
| heparin activity | 20 U/mg USP |
| APTT activity | 15 U/mg |
| anti-Xa activity | 135 U/mg USP |
| ratio | 9 |
| organic sulphur | 10.8% |
| uronic acids | 24.7% |
| rotatory power | +49° |
| molecular weight | 5,000 daltons |

EXAMPLE 2

5 g of electrophoresis-monoband dermatan sulphate having a specific rotatory power of −67° and a molecular weight of 32,000 daltons are dissolved in a pH 7.5 phosphate buffer solution using a quantity to give a total volume of 100 ml.

This solution is then treated as in Example 1.

About 2.5 g of depolymerized dermatan are obtained having the following chemical characteristics:

| | |
|---|---|
| organic sulphur | 7.2% |
| uronic acids | 28% |
| sulphate/carboxyl ratio | 1.45 |
| rotatory power | −63° |
| molecular weight | 6,300 daltons |

EXAMPLE 3

15 g of electrophoresis-monoband heparan sulphate having a rotatory power of +50° and a molecular weight of 13,000–16,000 daltons are dissolved in a pH 6.5 phosphate buffer solution using a quantity to give a total volume of 100 ml.

This solution is then treated as in Example 1.

About 9 g of depolymerized heparan are obtained with the electrophoretic characteristics of the starting material but with a molecular weight of about 6,000 daltons.

EXAMPLE 4

5 g of electrophoresis-monoband' chondroitin sulphate C of −29° rotatory power are dissolved in a pH 7 phosphate buffer solution using a quantity to give a total volume of 100 ml. The procedure of Example 1 is then followed.

About 3 g of a product are obtained with the electrophoretic and chemical characteristics of the starting material but with a molecular weight of about 7,000 daltons.

EXAMPLE 5

16 g of mesoglycan of the following composition:

| slow moving heparin | 10 ± 5% |
|---|---|
| heparan sulphate | 52 ± 5% |
| dermatan sulphate | 30 ± 5% |
| chondroitin sulphate | 8 ± 2% | obtained as described in U.S. Pat. No. 4,489,066 of 18.12.84 and containing 8% of organic sulphur and 24% of uronic acids are dissolved in 100 ml of pH 7.5 phosphate buffer. The solution is irradiated and fractionated by exclusive alcoholic treatment as in Example 1.

The purified lyophilized product (10 g) has 7.8% of organic sulphur and 22.8% of uronic acids.

We claim:

1. A process for the controlled preparation of low molecular weight glucosaminoglycans of from 1,000 to 35,000 daltons, and possessing anticoagulant activity of between 10 and 250 U/mg and an anti-Xa/APTT ratio of between 1 and 15, which comprises treating conventional high molecular weight glucosaminoglycans in the solid state or in solution form with a rectilinear gamma ray beam at doses within the range of 2.5 to 20 Mrad supplied in the static or dynamic phase by successive irradiation stages with cooling intervals between one irradiation stage and the next, then subjecting the solution obtained to chemical fractionation in order to eliminate the high molecular weight fractions, purifying the base fraction by reverse osmosis, further fractionating the purified solution through Sephacryl or Sephadex resin columns, transferring the fractions obtained to cationic resins, then neutralizing them with alkaline solutions and lyophilizing.

2. A process as claimed in claim 1, wherein said conventional glucosaminoglycans are heparins having an anticoagulant activity from 100 to 250 U/mg USP.

3. A process as claimed in claim 1, wherein said conventional glucosaminoglycans are selected from the group consisting of slow moving heparin, fast moving heparin, heparin sulphate, chondroitin-4-sulphate, chondroitin-6-sulphate, keratan sulphate, hyaluronic acid, alginic acid or mesoglycan, either singly or in mixtures thereof.

4. A process as claimed in claim 1, wherein said gamma ray treatment is conducted on glucosaminoglycans in aqueous solution, buffered to pH 2-8.

5. A process as claimed in claim 1, wherein said gamma ray treatment is conducted on aqueous 1-30% w/v concentration glucosaminoglycan solutions which are deaerated and purged with nitrogen.

6. A process as claimed in claim 1, wherein each of said successive irradiation stages provides a dose of 2-3 Mrad.

7. A process as claimed in claim 1, wherein said gamma ray treatment is conducted at a temperature of between 20° and 55° C.

8. A process as claimed in claim 1, wherein said chemical fractionation is conducted in a 2-5% w/v aqueous solution by treatment with methanol, ethanol or acetone in a quantity of between 10 and 30% v/v.

9. A process as claimed in claim 1, wherein said purification of the base fraction is conducted by reverse osmosis with 500 molecular weight cutoff until total elimination of the low molecular weight fractions and saline components is achieved.

10. A process as claimed in claim 1, wherein further fractionation of the purified solution is conducted in a column of material selected from the group consisting of Sephacryl S.200, Sephadex 50, Castel C/300 and Castel C/20.

11. A process as claimed in claim 1, wherein said neutralization is conducted with an alkaline Na, Ca, K, Mg or Li solution.

12. A process as claimed in claim 7, wherein said gamma ray treatment is conducted at a temperature of between 20° and 40° C.

* * * * *